United States Patent [19]

Schwerzel et al.

[11] Patent Number: 5,177,125

[45] Date of Patent: * Jan. 5, 1993

[54] TWO-PHASE CATHODIC ELECTROCOAT CONTAINING EPOXY RESIN-ATBN ADDUCTS

[75] Inventors: Thomas Schwerzel, Meckenheim; Hans Schupp, Worms; Klaus Huemke, Ludwigshafen; Ulrich Heimann, Muenster, all of Fed. Rep. of Germany

[73] Assignee: BASF Lacke & Farben Aktiengeselllschaft, Munster, Fed. Rep. of Germany

[*] Notice: The portion of the term of this patent subsequent to Sep. 24, 2008 has been disclaimed.

[21] Appl. No.: 747,442

[22] Filed: Aug. 14, 1991

Related U.S. Application Data

[63] Continuation of Ser. No. 632,669, Dec. 16, 1990, abandoned, which is a continuation of Ser. No. 476,880, Feb. 8, 1990, abandoned.

[30] Foreign Application Priority Data

Feb. 28, 1989 [DE] Fed. Rep. of Germany ....... 3906145

[51] Int. Cl.⁵ .............................................. C08L 63/10
[52] U.S. Cl. .................................... 523/404; 523/415; 523/416; 523/417; 523/420; 525/113; 204/181.4; 204/181.7; 428/413
[58] Field of Search ............... 523/404, 425, 416, 417, 523/420; 525/113; 204/181.4, 181.7; 428/413

[56] References Cited

U.S. PATENT DOCUMENTS

| | | | |
|---|---|---|---|
| 4,251,415 | 2/1981 | Nakada et al. | 523/414 |
| 4,298,656 | 11/1981 | Mendelsohn | 523/417 |
| 4,486,571 | 12/1984 | Holubka | 525/113 |
| 4,557,976 | 12/1985 | Geist et al. | 525/438 |
| 4,617,348 | 10/1986 | Dickie et al. | 525/122 |
| 4,639,493 | 1/1987 | Dickie et al. | 525/113 |
| 4,657,979 | 4/1987 | Dickie et al. | 525/113 |
| 4,689,131 | 8/1987 | Roue et al. | 528/105 |
| 4,865,704 | 9/1989 | Saatweber et al. | 204/181.7 |
| 5,001,193 | 3/1991 | Golden | 525/109 |
| 5,051,160 | 9/1991 | Schwerzel et al. | 204/181.4 |

FOREIGN PATENT DOCUMENTS

| | | |
|---|---|---|
| 0070550 | 1/1983 | European Pat. Off. |
| 0253404 | 1/1988 | European Pat. Off. |
| 2141127 | 12/1984 | United Kingdom |

Primary Examiner—John C. Bleutge
Assistant Examiner—Frederick Krass
Attorney, Agent, or Firm—Keil & Weinkauf

[57] ABSTRACT

A two-phase cathodic electrocoat is obtainable by coating an electrically conducting substrate with a mixture containing
A) an aqueous cationic dispersion of a polycondensation or polyaddition product,
B) an aqueous cationic dispersion of a polycondensation or polyaddition product having a glass transition temperature of from −80° to 20° C., the polymers of dispersions (A) and (B) being mutually incompatible, and C) optionally a crosslinking agent, a pigment paste, auxiliaries and/or additives, and then baking.

6 Claims, No Drawings

TWO-PHASE CATHODIC ELECTROCOAT CONTAINING EPOXY RESIN-ATBN ADDUCTS

This application is a continuation of application Ser. No. 07/632,669, filed on Dec. 26, 1990, now abandoned, which is a continuation of Ser. No. 476,880, filed Feb. 8, 1990, now abandoned.

The present invention relates to a two-phase cathodic electrocoat obtainable by depositing a mixture of two aqueous cationic dispersions of mutually incompatible polymers on an electrically conductive substrate and then baking.

Many of the present-day cathodic coating systems take the form of a dispersion comprising an ionically charged mixture of an organic binder and a crosslinking agent. Instead of this resin mixture it is of course also possible to use a self-crosslinking ionically charged resin. The binders for cathodic electrocoating compositions are usually basic nitrogen resins converted into dispersible polymers by protonation with an acid. Resins which have sulfonium or phosphonium groups are also known. Besides these basicity characteristics, the resin must also have functional groups which are capable of reacting with the crosslinking component. Examples of such groups are acidic hydrogen atoms, e.g. NH and OH groups, unsaturated olefinic double bonds, dienophiles and dienes. The resins can be prepared by polymerizing or copolymerizing unsaturated compounds which carry at least partly basic atoms. A frequent choice are polyaddition compounds formed by reacting epoxy resins with compounds which are reactive toward oxirane groups. The basic groups are frequently introduced by using primary, secondary or tertiary amines or permanent charges in the form of quaternary ammonium salts. Furthermore, the epoxy resins thus modified are reacted with flexibilizing compounds.

The addition of dispersed polymers has also been described. For instance, Moriarity in EP-A-70 550 describes dispersions obtained from reaction products of polyepoxies with polyoxyalkylenepolyamines. These reaction products confer good flow and higher flexibility on the coating compositions and also a higher cratering resistance. WO 86/05196 describes a reaction product of a polyoxyalkylenepolyamine with a monoepoxy for use in cathodic electrocoating.

McIntyre et al. in EP-A-253 404 describe a mixture of a cationic epoxy resin formed from a reaction product of a polyol diglycidyl ether with at least one bifunctional phenol and an optional blocking reagent with subsequent conversion of some excess oxirane groups into cationic groups and a further epoxy-based cathodic electrocoating resin. The advantage of these mixtures is that they give full control of the paint film thickness, in particular in relation to high-build systems.

It is a feature common to all prior art systems that the flexibilizing component which increases the elasticity of the paint film also reduces the glass transition temperature of the baked paint film. This has a disadvantageous effect on the temperature-dependent properties. For instance, corrosion protection is much impaired, in particular following a severe cyclical exposure test, for example the cyclical exposure test of VDA 621-415, which is carried out at a maximum temperature of 40° C., or the GM scab test (Fisher Body Division TM 54-26), which is carried out at a maximum temperature of 60° C.

It is an object of the present invention to develop coatings which ensure good corrosion protection in cyclical exposure tests, even at elevated temperature, but which also are highly elastic.

We have found that this object is achieved by coat with a two-phase structure.

The present invention accordingly provides a two-phase cathodic electrocoat obtainable by depositing a mixture containing A) an aqueous cationic dispersion of a polycondensation or polyaddition product, B) an aqueous cationic dispersion of a polycondensation or polyaddition product having a glass transition temperature of from −80° to 20° C., the polymers of dispersions (A) and (B) being mutually incompatible, and C) optionally a crosslinking agent, a pigment paste, auxiliaries and/or additives, on an electrically conductive substrate and then baking.

There now follow observations concerning the formative components:

A suitable component (A) is an aqueous dispersion of a polycondensation or polyaddition product. This product may possess hydrophilic groups such as quaternary ammonium groups and sulfonium or phosphonium groups, rendering it water-soluble or water-dispersible. Advantageously, however, it is possible to use the art recognized polycondensation or polyaddition products which contain primary and/or secondary hydroxyl groups and primary, secondary and/or tertiary amino groups and have an average molecular weight of from 200 to 20,000, such as aminoepoxy resins, aminopoly(meth)acrylate resins and/or aminopolyurethane resins. The use of aminoepoxy resins is preferred for basecoats intended to confer a high level of corrosion protection. The amino resins advantageously have amine numbers of from 30 to 150. The lower limit of the amine number should be 35, preferably 50, and the upper limit should be 120, preferably 100. Examples of aminoepoxy resins are reaction products of epoxy-containing resins having preferably terminal epoxy groups with saturated and/or unsaturated secondary and/or primary amines or aminoalcohols. These reaction products can be modified at the alkyl moiety by at least one primary and/or secondary hydroxyl group, by a mono- or dialkylamino group and/or by a primary amino group which is at least temporarily protected by ketiminization.

The epoxy resins used can be any desired materials provided they have an average molecular weight of from 300 to 6000 and contain on average from 1.0 to 3.0 epoxy groups per molecule, preferably compounds having 2 epoxy groups per molecule. Preference is given to epoxy resins having average molecular weights of from 350 to 5,000, in particular from 350 to 2,000. Particularly preferred epoxy resins are for example glycidyl ethers of polyphenols which on average contain at least two phenolic hydroxyl groups in the molecule and which are preparable in a conventional manner by etherification with an epihalohydrin in the presence of alkali. Aromatic polyepoxies having a higher epoxy equivalent weight can be prepared from those having a lower epoxy equivalent weight and polyphenols or else by a suitable choice of the ratio of phenolic OH groups to epihalohydrin.

The amino groups can be introduced in a conventional reaction as known to those skilled in the art and as described for example in EP 134 983, EP 165 556 and EP 166 314.

By introducing groups which are capable of crosslinking, e.g. blocked isocyanates, it is possible to render the amino resins self-crosslinking, as described for example in U.S. Pat. Nos. 4,692,503, 3,935,087 and EP 273 247.

The glass transition temperatures of the amino resins are advantageously within the range from 20° to 100° C., preferably from 20° to 80° C., particularly preferably from 25° to 45° C.

The amino resins can be converted into a water-soluble or water-dispersible form by protonation with an acid. A suitable acid is phosphoric acid, but it is preferable to use an organic acid, e.g. formic acid, acetic acid, propionic acid or lactic acid. It is also possible to add the resin to a water/acid mixture. In general, the dispersions used have a solids content of from 20 to 45% by weight, preferably from 30 to 40% by weight.

A suitable component (B) is an aqueous dispersion of a polycondensation or polyaddition product which has a glass transition temperature of from −80° to 20° C., preferably from −70° to 0° C., particularly preferably from −60° to −10° C., and is incompatible with the polymer of dispersion (A). The word "incompatible" means that a mixture of the polymers of dispersions (A) and (B) will separate and form two phases.

Suitable polyaddition products are for example the reaction products of butadiene/acrylonitrile copolymers which contain primary and/or secondary amino groups with epoxy resins. Suitable butadiene/acrylonitrile copolymers have acrylonitrile contents of from 5 to 45% by weight, preferably from 10 to 30% by weight, and butadiene contents of from 55 to 95% by weight, preferably from 70 to 90% by weight, and contain on average from 1.4 to 3.0 primary and/or secondary amino groups per molecule with or without tertiary amino groups. The average molecular weight ($\overline{M}n$) of the copolymers is advantageously from 500 to 15,000, preferably from 2,000 to 8,000.

The amino-containing copolymers are obtainable for example by reacting carboxyl-containing butadiene/acrylonitrile copolymers with diamines. Such copolymers are commercially obtainable, for example under the designation HYCAR® 1300×ATBN and HYCAR 1300×16 ATBN (from B. F. Goodrich), containing 10% by weight and 16.5% by weight of acrylonitrile respectively.

It is also possible to obtain amino-containing butadiene/acrylonitrile copolymers by partial hydrogenation of butadiene/acrylonitrile copolymers or by addition of primary amines to epoxy-containing butadiene/acrylonitrile copolymers.

Suitable epoxy resins are those which have an average molecular weight ($\underline{M}n$) of from 140 to 10,000 and contain on average from 1.5 to 3 epoxy groups, preferably 2 epoxy groups, per molecule.

Preferred epoxy compounds are glycidyl ethers of aliphatic diols such as butanediol or hexanediol or polyetherols or glycidyl ethers of polyphenols which contain on average two or more phenolic hydroxyl groups and are preparable in a conventional manner by etherification with an epihalohydrin in the presence of alkali. Examples of suitable phenol compounds are 2,2-bis(4-hydroxyphenyl)propane (bisphenol A), 4,4'-dihydroxybenzophenone, 1,1-bis(4-hydroxyphenyl)ethane, 1,1-bis(4-hydroxyphenyl)isobutane, 2,2-bis(4-hydroxy-tert-butylphenyl)propane, bis(2-hydroxynaphthyl)methane and 1,5-dihydrox-ynaphthalene. It is desirable in some cases to use aromatic epoxy resins having a higher molecular weight. They can be obtained by reacting the abovementioned diglycidyl ethers with a polyphenol, for example 2,2-bis(4-hydroxyphenyl)propane, and then further reacting the resulting product with epichlorohydrin to prepare polyglycidyl ethers.

The weight ratio of the butadiene/acrylonitrile copolymer to the epoxy resin is in general determined in such a way that from 1.05 to 20 moles, preferably from 1.2 to 4.0 moles, of NH groups of the amino-containing butadiene/acrylonitrile copolymer are used per mole of epoxy group of the epoxy resin.

The reaction is in general carried out by reacting the butadiene/acrylonitrile copolymer with an epoxy resin in an organic solvent or solvent mixture which is inert not only toward amino groups but also toward epoxy groups, at 20–150° C., preferably 50–110° C. The reaction time can be up to 20 hours.

The polymeric reaction products thus obtained have amine numbers of from 20 to 150 mg of KOH/g of solid substance, preferably 40–100 mg of KOH/g of solid substance.

By introducing groups capable of crosslinking, e.g. blocked isocyanates, it is possible to render the amino resins self-crosslinking, as described for example in U.S. Pat. Nos. 4,692,503, 3,935,087 and EP 273 247.

The amino groups of these acids can be wholly or partly neutralized with an acid and the protonated resin dispersed by the addition of water. A suitable acid is phosphoric acid, but it is preferable to use an organic acid such as formic acid, acetic acid, propionic acid or lactic acid. It is also possible to add the resin to a water-/acid mixture. Thereafter the organic solvents may be distilled off.

In general, the dispersions used have a solids content of from 5 to 40% by weight, preferably from 15 to 25% by weight.

Optional component (C) comprises customary crosslinking agents, pigment pastes, auxiliaries and/or additives.

Suitable crosslinking agents are for example aminoplast resins such as urea-formaldehyde resins, melamine resins and benzoguanamine resins, blocked isocyanate type crosslinking agents, crosslinking agents which cure by esteraminolysis and/or transesterification, e.g. β-hydroxyalkyl ester type crosslinking agents as described in EP 40 867 and carbalkoxymethyl ester type crosslinking agents as described in DE 3 233 139. Further possible crosslinking agents are phenolic Mannich bases as described for example in DE 3 422 457.

If either or both of components (A) and (B) is self-crosslinking, no crosslinking agent need be used.

Besides customary pigment pastes it is also possible to use auxiliaries and/or additives such as solvents, flow control agents, defoamers or curing catalysts.

Components (A), (B) or (C) can be used within a wide weight ratio. It is advantageous to use from 10 to 90% by weight, preferably from 40 to 75% by weight, of component (A), from 10 to 50% by weight, preferably from 5 to 20% by weight, of component (B) and from 0 to 50% by weight, preferably from 20 to 40% by weight, of component (C), the weight percentages of components (A), (B) and (C) adding up to 100% by weight.

Besides using components (A) and (B) as aqueous cationic dispersions it is also possible to use their starting resins for preparing the mixture by for example neutralizing an amino-containing resin wholly or partly with an acid and dispersing the protonated resin by the addition of water. The second protonated resin can then be dispersed in the dispersion of the first protonated resin. However, it is also possible to protonate the two resins and to disperse them together Suitable acids are the acids mentioned for the preparation of the cationic dispersions (A) and (B).

It is also possible to disperse the resins individually in succession or together in an acid/water mixture.

Component (C) can be added before, during or after the preparation and mixing of components (A) and (B).

For cathodic electrocoating, the solids content of the electrocoating bath is in general set to 5-30% by weight. Deposition customarily takes place at from 15° to 40° C. in the course of from 0.5 to 5 minutes and at a pH of from 4.0 to 8.5, preferably a neutral pH, at a voltage of from 50 to 500 volts. In cathodic electrocoating, the electrically conducting object to be coated is connected as the cathode. The deposited film is cured at above 100° C. in the course of about 20 minutes.

The cured films have two phases and, from DSC measurements, two glass transition temperatures. The glass transition temperature which is assignable to the crosslinked polymer of starting component (A) is in general within the range from 50° to 150° C., preferably from 70° to 110° C., particularly preferably from 80° to 110° C. The glass transition temperature which is assignable to the polymer of starting component (B) is in general within the range from −80° to +20° C., preferably from −70° to 0° C., particularly preferably from −50° to −10° C.

The advantage of these systems, which on baking form two phases, is that the hard polymer matrix which is responsible for such important properties as for example corrosion protection and sandability, is preserved, whereas the soft phase distinctly improves the elasticity of the coatings.

EXAMPLES 1 TO 7

Preparation of Polymeric Reaction Products According to the Present Invention

General Method

In all the Examples, the butadiene/acrylonitrile component used was a copolymer having an average molecular weight $\overline{M}_n$ of 3500-3800, obtainable by reacting aminoethylpiperazine with carboxyl-terminated butadiene/acrylonitrile copolymers having an acrylonitrile content of 16% by weight (Hycar 1300×16 ATBN).

In Examples 1 to 5, the epoxy resin used was a polytetrahydrofuran diglycidyl ether having an epoxy equivalent weight (EEW) of 840. In Example 6, a polypropylene oxide diglycidyl ether (EW = 330) was used. In Example 7, a bisphenol-A diglycidyl ether (EEW = 188) was used.

The butadiene/acrylonitrile copolymer was dissolved in toluene, admixed with the epoxy resin and stirred at 80° C. for several hours (see Table I) until the epoxy value was virtually zero. Thereafter, the reaction mixture was diluted with ethylene glycol monobutyl ether and isobutanol and cooled down to 40° C. Acetic acid was then added, followed by deionized water in the course of an hour.

Thereafter, some of the organic solvents and water was distilled off under reduced pressure, and the solids content listed in the table was then set with deionized water.

The details of these experiments are given in Table I.

TABLE I

| Example | 1 | 2 | 3 | 4 | 5 | 6 | 7 |
|---|---|---|---|---|---|---|---|
| Bu/AN copolymer [g] | 359.8 | 359.8 | 359.8 | 359.8 | 359.8 | 172.9 | 359.8 |
| Epoxy resin [g] | 23.1 | 46.3 | 52.9 | 61.7 | 70.7 | 27.4 | 9.2 |
| Toluene [g] | 164.1 | 174.0 | 176.9 | 180.6 | 184.5 | 85.8 | 158.1 |
| Ethylene glycol monobutyl ether [g] | 62.9 | 68.4 | 68.2 | 62.4 | 59.4 | 41.4 | 86.0 |
| Isobutanol [g] | 97.1 | 116.0 | 119.0 | 112.0 | 111.0 | 73.2 | 125.3 |
| Acetic acid [g] | 5.9 | 6.4 | 6.3 | 5.8 | 5.5 | 3.8 | 5.5 |
| Water [ml] | 1463 | 1588 | 1588 | 1452 | 1452 | 960 | 2000 |
| Reaction time [h] | 12 | 10 | 10 | 10 | 11 | 10 | 19 |
| Solids content [wt. %] | 17 | 19 | 17 | 18 | 18 | 18 | 17 |
| Amine number [mg of KOH/g of solid substance] | 65.0 | 61.2 | 60.3 | 58.4 | 57.4 | 59.8 | 59.4 |

Electrocoating Baths a) Preparation of the Base Resin a1) A mixture of 5,800 g of hexamethylenediamine, 7,250 g of dimeric fatty acid and 1,400 g of linseed oil fatty acid was slowly heated to 195° C. while the water formed (540 g) was distilled off. The mixture was then cooled down to 100° C. and diluted with 5,961 g of toluene to a solids content of 70% by weight. The product had an amine number of 197 mg of KOH/g.

a2) In a second stirred vessel, 10 equivalents of a diglycidyl ether based on bisphenol A and epichlorohydrin having an equivalent weight of 485 were dissolved in a solvent mixture of 1,039 g of toluene and 1,039 g of isobutanol by heating. The solution thus formed was cooled down to 60° C. and admixed with 300.4 g of methylethanolamine and 128 g of isobutanol, the temperature rising to 78° C. in the course of 5 minutes. Thereafter, 1,850 g of the condensation product obtained by a1) were added, and the mixture was heated at 80° C. for 2 hours.

b) Preparation of the Pigment Paste

To 525.8 g of the binder obtained by a) were added 168.7 g of butylglycol, 600 g of water and 16.5 g of acetic acid. This was followed by 800 g of titanium dioxide, 11 g of carbon black and 50 g of basic lead silicate, and the mixture was ball-milled to a particle size of less than 9 µm. Thereafter, a solids content of 47% by weight was set with water.

c) Preparation of the Crosslinking Agent

A mixture of 1.32 kg of toluene, 0.42 kg of trimethylolpropane and 0.72 kg of bisphenol A was stirred at 60° C. until a homogeneous solution had formed. This solution was added to a hot mixture of 3.45 kg of isophorone diisocyanate, 0.86 kg of toluene and 0.0034 kg of dibutyltin dilaurate at 60° C. The mixture was maintained at 60° C. for 2 hours and then admixed with 2.0 kg of dibutylamine, the rate of addition being such that the temperature of the reaction mixture did not exceed 80° C. 1.11 kg of toluene were then added, and the mixture was maintained at 80° C. for a further hour.

d) Preparation of the Electrocoating Baths 700 g of the binder obtainable by a) and 300 g of crosslinking agent c) were dispersed by the addition of 19 g of acetic acid with sufficient water to form a dispersion having a solids content of 31% by weight. Organic solvents were then distilled off azeotropically, and thereafter the dispersion was adjusted with water to a solids content of 35% by weight.

The dispersion thus obtained was mixed with 775 g of the pigment paste obtainable by b) and with varying amounts of the dispersion according to the present invention and made up with water to a volume of 5,000 ml.

The electrocoating baths were stirred at 30° C. for 168 hours. Cathodes comprising zinc phosphatized test panels of steel were coated with paint films in the course of 120 seconds. These paint films were then baked at 160° C. for 20 minutes.

The compositions of the baths, the coating conditions and the test results are summarized in Table II.

groups per molecule, the weight ratio of the butadiene/acrylonitrile copolymer to the epoxy resin being selected so that from 1.05 to 20 moles of NH groups of the amino-containing butadiene/acrylonitrile copolymer are used per mole of epoxy group of the epoxy resin, the amino epoxy resin having a glass transition temperature of from −80 to 20° C., and, optionally C) a cross-linking agent, a pigment paste, a solvent, a flow control agent, a defoamer and/or a curing catalyst, wherein the polymers of dispersions (A) and (B) are mutually incompatible, and, thereafter baking the deposited mixture.

2. A two-phase coat as defined in claim 1, obtained by using a mixture containing
10–90% by weight of component (A),
10–50% by weight of component (B) and
0–50% by weight of component (C),
the percentages of components (A), (B) and (C) adding up to 100% by weight.

3. A two-phase coat as defined in claim 1, wherein the polymers of dispersion A have a glass transition temperature of from 50° to 150° C. and the polymers of dispersion B have a glass transition temperature of from −80° to +20° C.

4. A two-phase coat as defined in claim 1, wherein the polymers of dispersion A have a glass transition temper-

TABLE II

| Bath | Electro-coating dispersion [g] | Dispersion acc. to pres. inv. [g] | /No. | U [V] | LD [μm] | Erichsen scratch test [mm] | RI [Nm] | 480 h SST [mm] | CET [mm] | Tg1 [°C.] | Tg2 [°C.] |
|---|---|---|---|---|---|---|---|---|---|---|---|
| 1 | 1836 | — | — | 280 | 23 | 5.3 | <2.3 | 1.0 | 1.6 | — | 89 |
| 2 | 1653 | 403 | 1 | 280 | 23 | 7.5 | 10.1 | 0.5 | 1.1 | −54 | 85 |
| 3 | 1653 | 372 | 2 | 290 | 25 | 6.4 | 10.1 | 0.7 | 1.3 | −54 | 87 |
| 4 | 1653 | 408 | 3 | 300 | 22 | 6.9 | 13.5 | 0.7 | 1.2 | −53 | 87 |
| 5 | 1791 | 94 | 4 | 260 | 23 | 6.9 | 2.3 | 0.9 | 1.6 | −55 | 88 |
| 6 | 1745 | 187 | 4 | 250 | 20 | 6.6 | 4.5 | 1.1 | 1.1 | −56 | 87 |
| 7 | 1653 | 374 | 4 | 280 | 25 | 8.5 | >18.1 | 1.1 | 0.9 | −54 | 85 |
| 8 | 1653 | 368 | 5 | 280 | 24 | 8.4 | >18.1 | 0.7 | 0.9 | −52 | 87 |
| 9 | 1653 | 376 | 6 | 260 | 26 | 7.5 | 11.3 | 1.2 | 1.2 | −52 | 87 |
| 10 | 1653 | 415 | 7 | 280 | 20 | 8.6 | 18.1 | 1.1 | 1.2 | −51 | 87 |

U: Deposition voltage
LD: Layer thickness
RI: Reverse impact test, determined with a mandrel impact tester from Gardner in accordance with ASTM D 2794
480 h SST: 480 hours of salt spray test on untreated steel, subpenetration in mm in accordance with DIN 50021
CET: 10 cycles of cyclical exposure test in accordance with VDA 621-415, subpenetration in mm
Tg1, Tg2: Glass transition temperatures of the two phases, measured by DSC in accordance with

We claim:

1. A two-phase cathodic electrocoat obtained by depositing on an electrically conductive substrate a mixture comprising
A) an aqueous cationic dispersion of an amino epoxy resin obtained by reaction of an epoxy resin with a primary amino-functionalized compound selected from the group consisting of saturated amines and saturated aminoalcohols, and
B) an aqueous cationic dispersion of an amino epoxy resin obtained by reacting a butadiene/acrylonitrile copolymer which contains primary and/or secondary amino groups with an epoxy resin having an average molecular weight of from 140 to 10,000 and containing an average from 1.5 to 3 epoxy ature of from 70° to 110° C. and the polymers of dispersion B have a glass transition temperature of from −70° to 0° C.

5. A two-phase coat as defined in claim 1, wherein the polymers of dispersion A have a glass transition temperature of from 80° to 110° C. and the polymers of dispersion B have a glass transition temperature of from −60° to −10° C.

6. A two-phase cathodic electrocoat as defined in claim 1 wherein the weight ratio of the butadiene/acrylonitrile copolymer to the epoxy resin is selected so that 1.2 to 4.0 moles of NH groups of the amino-containing butadiene/acrylonitrile copolymer are used per mole of epoxy group of the epoxy resin.

* * * * *